United States Patent [19]
Duchon et al.

[11] Patent Number: 5,828,447
[45] Date of Patent: Oct. 27, 1998

[54] ORIENTATION LOCATION SYSTEM OF AN OBSERVATION INSTRUMENT

[75] Inventors: Paul Duchon, Venerque; Georges Otrio, Auzielle, both of France

[73] Assignee: Centre National D'Etudes Spatiales, France

[21] Appl. No.: 793,508

[22] PCT Filed: Aug. 29, 1995

[86] PCT No.: PCT/FR95/01130

§ 371 Date: Feb. 25, 1997

§ 102(e) Date: Feb. 25, 1997

[87] PCT Pub. No.: WO96/07120

PCT Pub. Date: Mar. 7, 1996

[30] Foreign Application Priority Data

Aug. 29, 1994 [FR] France .................................. 94 10368

[51] Int. Cl.$^6$ ................................................. G01B 11/26
[52] U.S. Cl. ........................ 356/152.1; 250/208; 356/138
[58] Field of Search .................. 356/152.1, 141, 356/255, 153, 138, 1, 150, 151, 247, 152.2, 152.3; 250/203 R, 202, 224, 225, 208

[56] References Cited

U.S. PATENT DOCUMENTS

| | | | |
|---|---|---|---|
| 3,637,312 | 1/1972 | Cantor et al. | 356/152 |
| 4,123,164 | 10/1978 | Tambor | 356/152 |
| 4,154,532 | 5/1979 | Emmerich | 356/152 |
| 4,159,419 | 6/1979 | Wittke | 250/203 R |
| 4,187,422 | 2/1980 | Zoltan | 250/203 R |

*Primary Examiner*—Frank G. Font
*Assistant Examiner*—Michael P. Stafira
*Attorney, Agent, or Firm*—Hayes, Soloway, Hennessey, Grossman & Hage, P.C.

[57] ABSTRACT

An observation instrument located on a satellite is provided with light sources, whose radiation is reflected by the facets of at least one optical dihedron, whose shape is such that it deflects very slightly or not at all the reflected beam, even if it is displaced. Thus, the reflected beam, which is representative of the sighting axis of the instrument is reflected to a sensor, having a known orientation, in order to give the real direction of the axis. The invention has application to locations or tracking on the ground by the instrument.

6 Claims, 8 Drawing Sheets

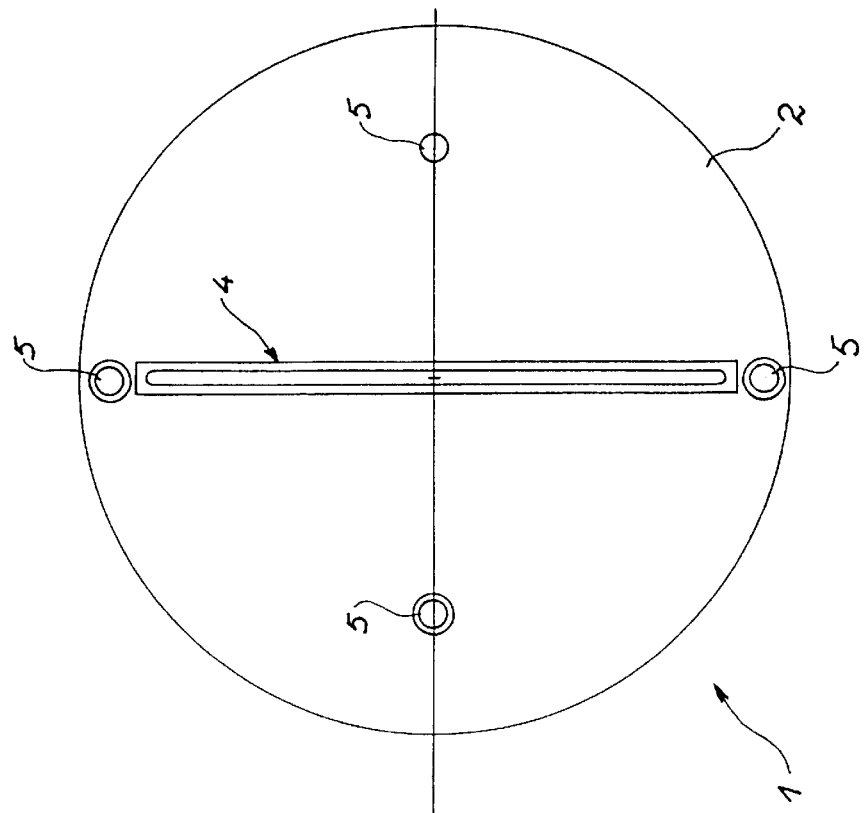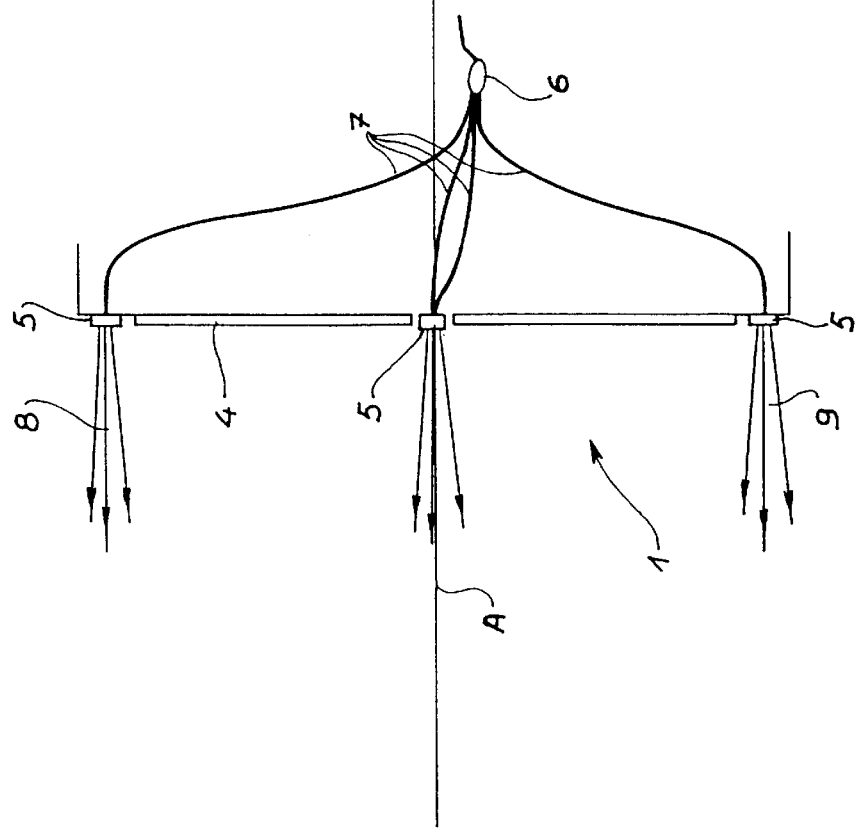

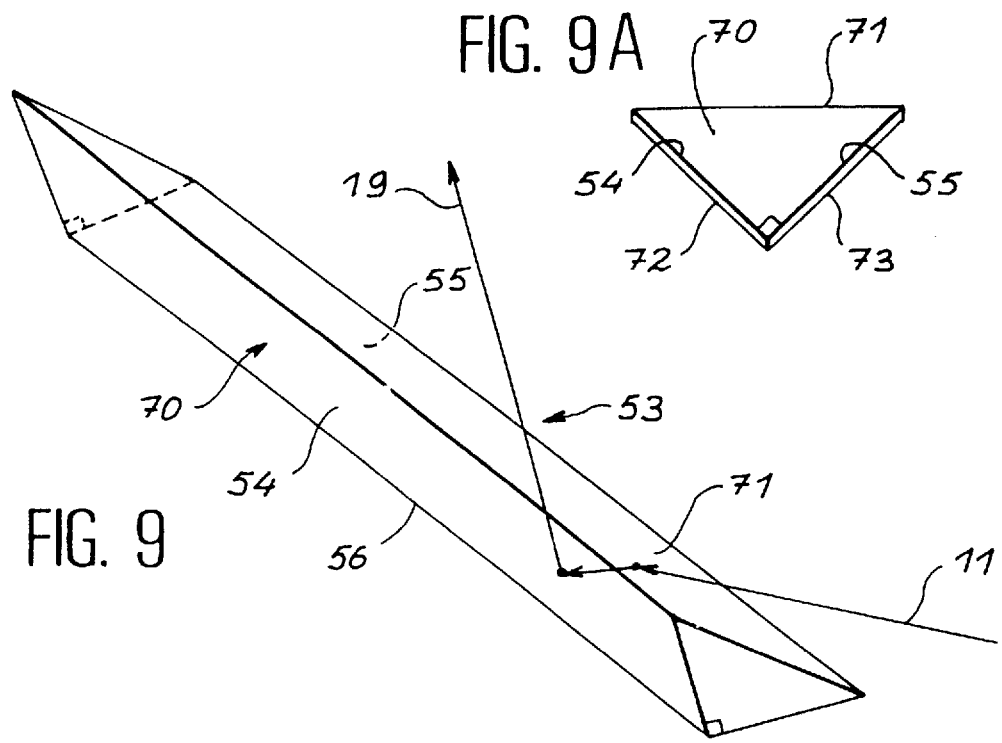
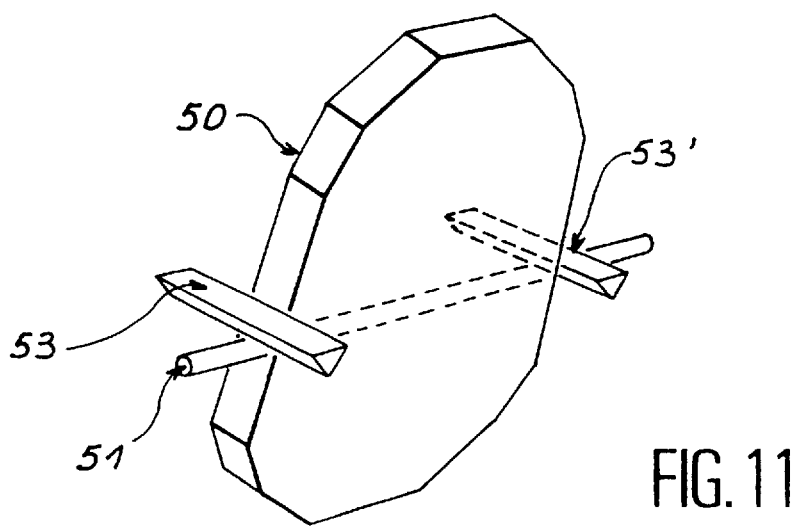

ORIENTATION LOCATION SYSTEM OF AN OBSERVATION INSTRUMENT

BACKGROUND OF THE INVENTION

1. Field of the Invention

The invention relates to orientation locating systems of an observation instrument.

2. Discussion of the Prior Art

It constitutes an improvement to a patent application with the same title and same inventors filed in France under No. 93 14872 and which described a system more particularly formed by an observation instrument, a source of a light pattern integral with the instrument, a system for reflecting the light from the source and a sensor of the light from the pattern. The reflecting system was formed by at least one mirror, whose function was to direct the light from the light pattern to the light sensor, which was equipped with an orientation reference. It could in particular be a stellar sensor, detecting at the same time as the pattern, the light of a star. The comparison of the positions of the images of the pattern and the star gave the angular deviation between the direction of the star and the emission direction of the light pattern before the reflecting system. The orientation of the instrument was deduced therefrom. In other designs, the light sensor affected by the pattern was integral with a stellar sensor or the like for supplying the reference, which gave the same result. However, a stellar sensor was preferred for giving the orientation reference due to the immobility of stars in a fixed reference mark and the sharpness of their appearance. In particular, preference is given to the measurement of the sighting direction with respect to the stars for a better precision.

The preference for a stellar sensor explains why the earlier invention was more particularly used in spacecraft such as satellites, interplanetary probes or space stations equipped with instruments for observing astrons such as the Earth, the same applying here.

The very precise knowledge of the sighting axis direction of an observation instrument is essential if it is wished to appropriately locate the observed location. At present, it is known to perfectly located an orbiting satellite (with uncertainties of 10 to 100 m for the GPS system and only 0.5 to 40 m for the DORIS system, as a function of conditions), whereas the global orientation of the sighting axis of the observation instruments is in practice only known with an uncertainty of at best 100 to 200 angular seconds, which corresponds to approximately 400 to 800 m position uncertainty on the ground for a satellite at a height of 800 km. Although this sighting orientation uncertainty is small in itself, it contributes to almost the entire location uncertainty and it is wished to reduce this.

In practice, there are three categories of instruments. The first are fixed to the craft, which must therefore be completely turned (deviated) so that the desired instrument is oriented in the desired direction. This design is not very advantageous more particularly due to the necessary energy costs. The uncertainty of the orientation of the sighting axis of the instrument is then more particularly dependent of the installation of the instrument on the craft and can be increased by disturbances such as vibrations or deformations due to localized heating produced on a single face of the craft by solar radiation.

Thus, the two other instrument categories comprise instruments equipped with mechanisms for orienting the instrument on the vehicle and, which is much more frequently encountered at present, the instruments fixed to the vehicle, but provided with sighting change mirrors placed in front of the instrument observation field and which modify at random its sighting direction when they are turned. The sighting axes are then directed much more simply. In all cases, the mobile mechanism or mirrors are responsible for supplementary orientation uncertainties.

U.S. Pat. No. 4,187,422 describes an orientation calibration system of a stellar sensor by projecting a light pattern through a source integral with the sensor towards a prism reflecting the image of the pattern onto the sensor. The position of the image on the sensor gives the orientation of the latter.

In the preceding application, it was shown that the light beams emitted by the source with a known orientation with respect to the sighting axis (in principle parallel thereto) and reflected by the reflecting system towards the light sensor, made it possible to evaluate with a much higher precision the direction of the sighting axis, to the extent that the ground location uncertainty was no more than a few dozen meters.

The invention aims at an orientation locating system for an observation instrument using a principle used in the earlier application, namely the materialization of the sighting axis of the instrument by a light beam able to form a light pattern on a surface and which is deflected towards a light sensor, but an at least as precise estimate of the sighting axis is obtained with the present invention due to optical devices specially adapted to this equipment and which are largely insensitive to position or orientation displacements due to a preliminary calibration of the system.

SUMMARY OF THE INVENTION

The system then comprises a light source integral with the instrument emitting a light pattern, a mirror-equipped light reflecting system and a light sensor provided with an orientation reference, the reflecting system being designed to transmit light from the source to the sensor, characterized in that the mirrors comprise a dihedron having two facets on which the light from the source is successively reflected.

A particularly favourable configuration for knowing the orientation of the sighting axis with high precision in the absence of a sighting change mirror in front of the instrument is that of a system also comprising a second mirror-equipped light reflecting system, said second system being designed to transmit the light from the source to a sensor, characterized in that the mirrors of the second reflecting system comprise a dihedron having two facets on which the light from the source is successively reflected and it comprises an optical system placed between the light source and the reflecting systems, which defocusses the light of the source in order to form a widened light beam, the dihedrons of each of the reflecting systems being immobile and intercepting a respective portion of the widened light beam. There is preferably a single sensor for the two reflecting systems and said systems then reflect the light from the source in two planes, which can form a non-zero angle and as close as possible to 90°.

An interesting dihedron shape is a prism, whose reflecting facets are at an angle of 45° or 135° and are joined by an edge substantially perpendicular to the direction of the widened beam, because the beam is then still reflected at right angles.

The light sensor used for defining the alignment of the sighting axis can be located at the end of the reflecting system, but it is also possible to have there a mirror, which reflects the beam by the reflecting system to the observation instrument, which integrates the light sensor or which coincides therewith, the instrument then itself checking its orientation.

With sighting change mirror-equipped instruments, it is proposed that a dihedron is integral with a sighting change mirror turning in front of the instrument, the reflecting facets of the dihedron forming a right angle and being joined by an edge perpendicular to the plane and to the rotation axis of the sighting mirror in order to obtain here once again a high sighting axis evaluation precision. Once again improvements are possible in this variant.

BRIEF DESCRIPTION OF THE DRAWINGS

The invention is described in greater detail hereinafter with reference to the attached drawings, wherein show:

FIG. 1 A lateral section of the focal plane of the observation instrument.

FIG. 2 A front view of the instrument focal plane.

FIGS. 9 & 9A The construction of the dihedron.

FIG. 11 Partially an improved location system for a sighting change mirror-equipped system.

DESCRIPTION OF THE PREFERRED EMBODIMENTS

Figure 3:
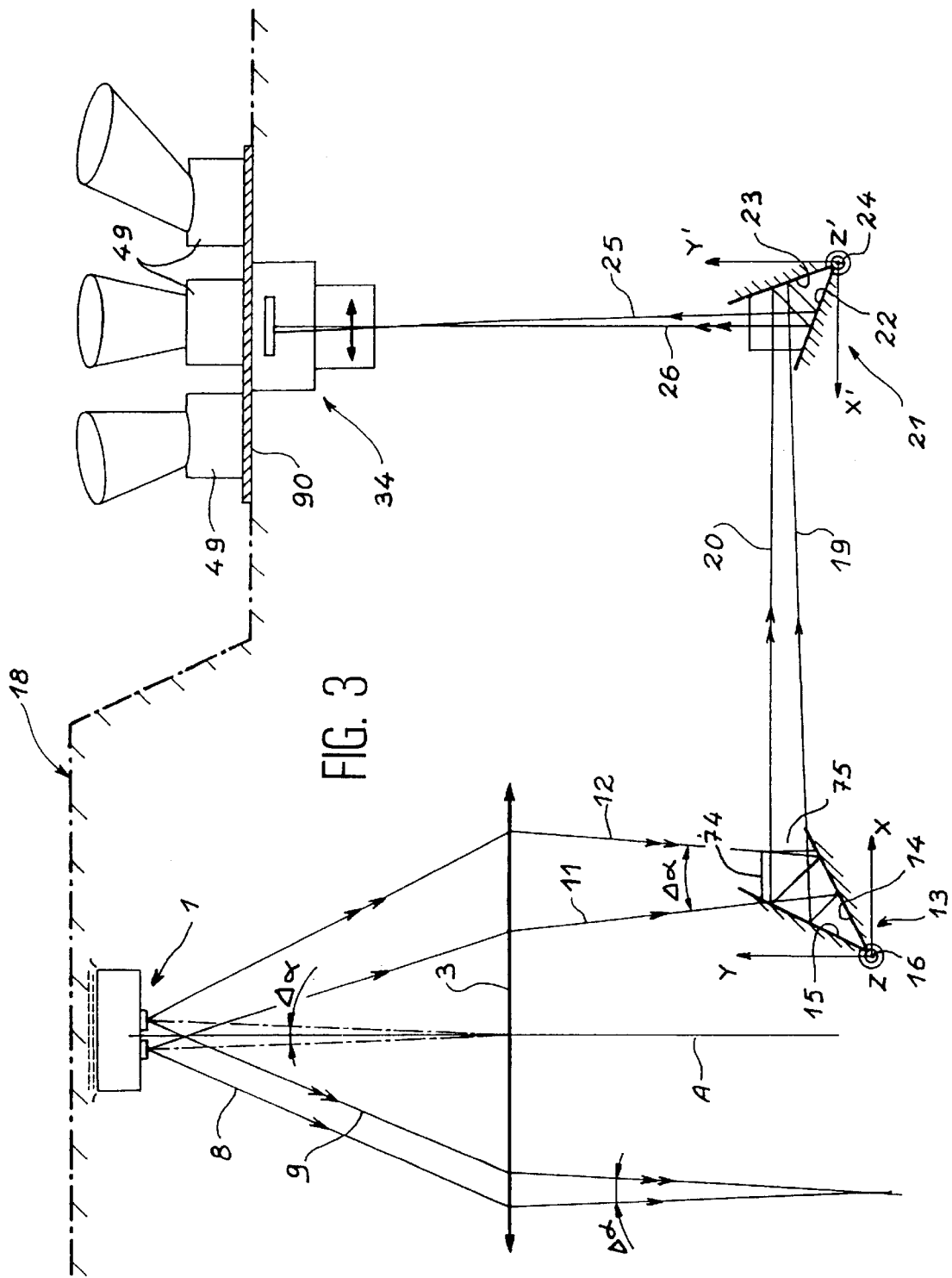
FIG. 3 A view of a partial location system with a fixed observation instrument.

FIGS. 1 and 2 show the focal plane of the observation instrument and the light source serving as an orientation reference for the same materializing its sighting axis A. The instrument 1 is terminated by a smooth front face 2 coinciding with the focal plane of an optical system 3 (shown in FIG. 3) which precedes the instrument 1 and extends into its field of observation. The optical system 3 is symbolized by a focussing lens, but can comprise any randomly combined components of a conventional nature. A detector array 4, which here constitutes the receiving part of the instrument 1, is placed across the front face 2.

The light source is here formed by four points or dots 5 arranged in lozenge-like manner on the front face 2 around the detector array 4. It has been seen in the preceding application that a single point source was not sufficient, because it did not make it possible to establish certain rotations of the instrument 1 and in particular the rotations about its emission axis, but that two sources were sufficient and that a larger number could be desirable in order to obtain a better precision. A single diode 6 can be sufficient for the production of all the light spots 5, provided that it is placed behind a bundle of optical fibres 7 connecting it to each of the spots 5. It is possible to use a light emitting diode 6 or a laser effect diode, the latter being preferable because it supplies finer light rays with a less dispersed wavelength. A wavelength of 0.95 $\mu$m is suggested. The light spots 5 are very fine with a diameter of e.g. 20 $\mu$m and the light will be emitted in the form of substantially parallel beams, having a limited divergence and which can be likened to single light rays.

FIG. 3 shows that these rays 8 and 9 are defocussed when they have traversed the optical system 3 and then form widened beams 11 and 12, which occupy roughly the same volume. Only two beams of light rays are shown in the drawing, but in reality there are the same number as there are light spots 5. The beams have a slight orientation difference $\Delta\alpha$, which can be a few fractions of a degree and is equal to that of the light rays which have given rise to the same. This orientation difference $\Delta\alpha$ is exaggerated in FIG. 3, as is the divergence of the light rays 8 and 9.

An optical dihedron 13 is placed on the path of the beams 11 and 12 in order to intercept a portion thereof. It is formed by two reflecting facets 14 and 15 successively reached by the intercepted portions of the two beams 11 and 12 and said facets are joined by an edge 16 perpendicular to the sighting axis A of the instrument 1. The dihedron 13 is fixed to a spacecraft 18, like the instrument 1.

The portions of the beams 11 and 12 intercepted by the dihedron 13 are consequently successively reflected onto the facets 14 and 15 and reflected forming reflected beams 19 and 20. The facets 14 and 15 are directed against one another forming an angle of 45°. This special shape leads to remarkable properties which should be appreciated. Firstly, an accidental rotation of the dihedron 13 about the axis Z of the edge 16 does not modify the orientation of the reflected beams 19 and 20. A translation of the dihedron 13 along the axes X, Y (at 22.5° of facets 14 and 15) and Z also has no effect on this orientation. The only effect of rotations of the dihedron 13 about the axes X and Y is that they turn the reflected beams 19 and 20 in a plane parallel to the plane of the axes X and Z. This property is strictly proved for rotations about the axis Y and with a small and negligible error for the small rotational variations encountered in practice around axis X, because this is a second order error (a supplementary rotation of $10^{-6}$ radian of the reflected beams is produced for a rotation of $10^{-3}$ radian of the dihedron 13).

The reflected beams 19 and 20 then arrive at a second dihedron 21, like the first, which is fixed to the spacecraft 18 and formed by two facets 22 and 23 directed towards one another at 45°, which successively reflect them in accordance with return beams 25 and 26 towards an alignment sensor 34.

These facets 22 and 23 are at 22.5° of axes X' and Y' respectively opposite to X and parallel to Y. They are joined by an edge 24 coinciding with an axis parallel to Z and of the opposite sense. The second dihedron 21 has the same optical properties as the first, because it is of the same shape and in particular the reflected radiation direction stability properties. As the facets are at 45°, the rays reflected by the dihedrons 13 and 21 are at right angles with the incident rays. It can be seen that a rotation of the first dihedron 13 about the axis X or Y, which leads to a rotation of the reflected beams 19 and 20 about an axis parallel to the axis Y, will have the same effect as a rotation of the second dihedron 21 about the axis X' or Y' on the orientation of the return beams 25 and 26, opposing beams 11 and 12 and perfectly parallel thereto when the dihedrons 13 and 21 are accurately positioned and which could only be deflected by rotations in a single plane, perpendicular to the drawing, or parallel to the planes defined by the axes Y and Z or Y' and Z'.

Figure 4:
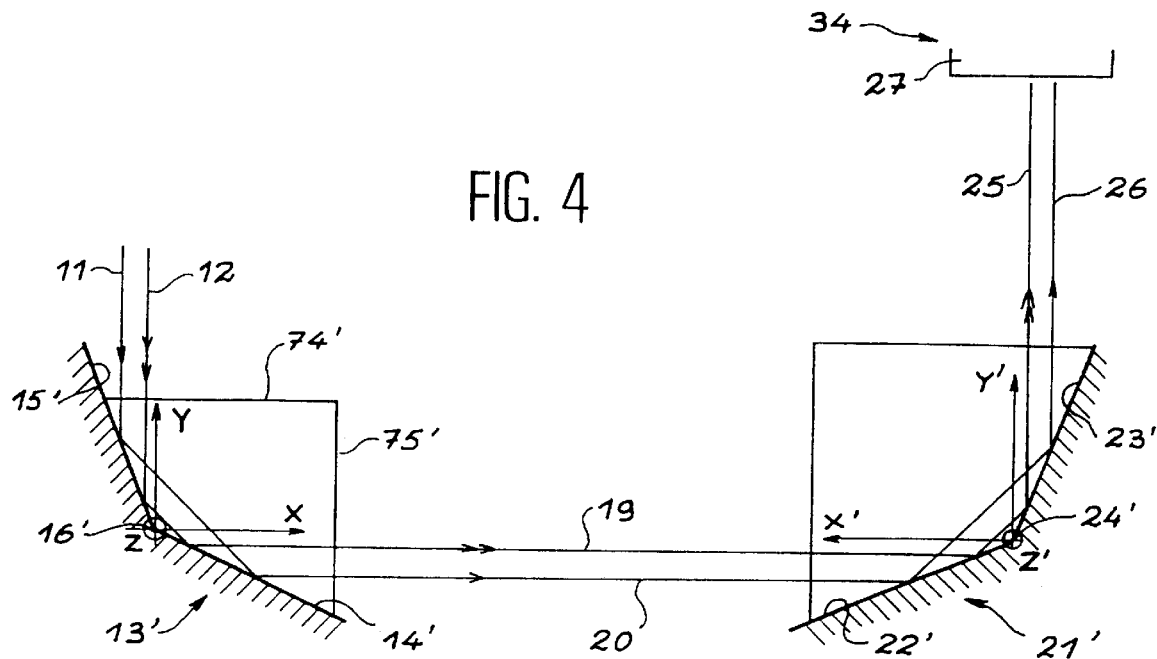
FIG. 4 A variant.

An equivalent concept is shown in FIG. 4. The dihedrons 13 and 21 are replaced by dihedrons 13' and 21', whose facets 14' and 15' or 22' and 23' still form angles of 22.5° with axes X, Y, X' or Y' like those of FIG. 3, but the planes of the facets here form angles of 135° with one another. The optical properties of the dihedrons 13' and 21' are the same as those of dihedrons 13 and 21 and the result on the reflected beams 19, 20 and return beams 25, 26 is the same. The only difference is that the reflections on the facets 15' and 23' precede those on the facets 14' and 22'.

Figure 5:
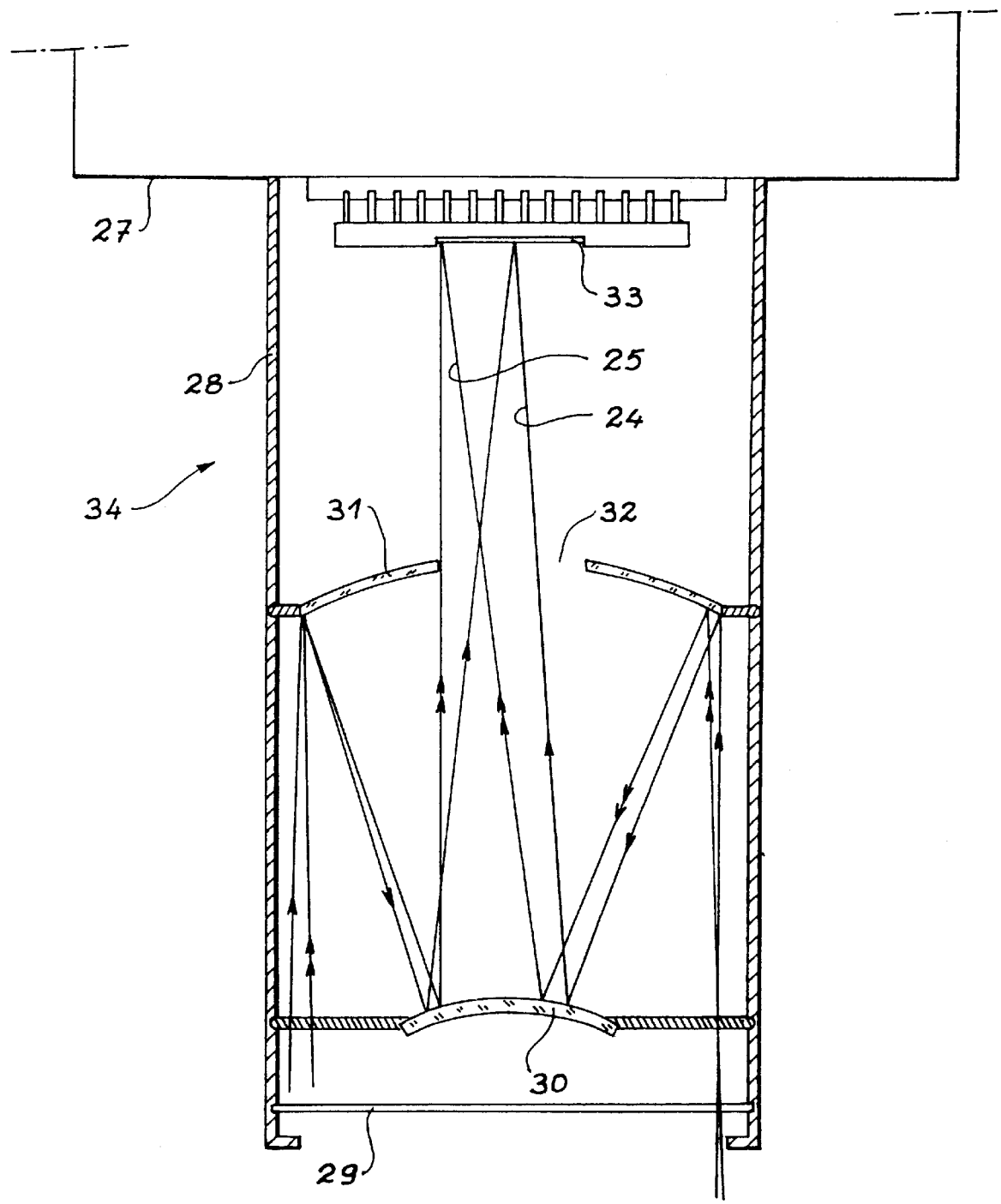
FIG. 5 An optical device upstream of the light sensor.

The alignment sensor 34 can be of a type appropriate for the measurement of small viewing fields (e.g. a solid angle of four degrees on the side). As can be seen in FIG. 5, its box 27 is preceded by a cylindrical envelope 28 at the entrance of which is located a filter 29, which only permits the passage of the wavelengths produced by the diode 6. A part of the return beams 25 and 26 passes around a secondary mirror 30 occupying the centre of the box 27, but is reflected towards it by a primary mirror 31, which starts to focus them. A second focussing is produced by the secondary mirror 30, which reflects the return beams 25 and 26 towards the primary mirror 31, but in reality making them pass through a central hole 32 thereof.

The return beams 25 and 26 finally arrive at a square matrix detector system 33 constituting the sensitive element of the alignment sensor 26. They are then roughly focussed and form a pattern of light spots 35 having the same number of spots as that of the light source. The defocussed light loss resulting from the light escaping the dihedrons 13 and 21 and the mirrors 31 and 32, or which is absorbed by them, only leads to an attenuation of the light pattern 35, but does not deform it. The only detected effect corresponds to the orientations of the light rays 8 and 9, which are chosen so that the beams 11 and 12, 19 and 20 and 25 and 26 converge on the detector system 33, whose surface is reduced.

If the light spots 5 are symmetrical to the sighting axis A, as well as the directions of their rays 8 and 9, a ray emitted in the sighting axis and reflected by the dihedrons 13 and 21 will lead to the centre of the light spot pattern 35, i.e. to spot 36.

An electronic system integrated into the alignment sensor 34 measures the positions of the spots 35 and calculates that of the spot 36. Its design and programming are elementary for the expert and will consequently not be described here. In an envisaged variant where the detector system 33 has 1024 detectors on each side, corresponding to the same number of image points or spots and 23 $\mu$m on the side, whereof each covers approximately 13.5 angular seconds, the arrangement is such that the light spots 35 extend over three detectors. The spot 36 can then be calculated with a positional uncertainty equivalent to an angular uncertainty of two angular seconds.

Figure 6:
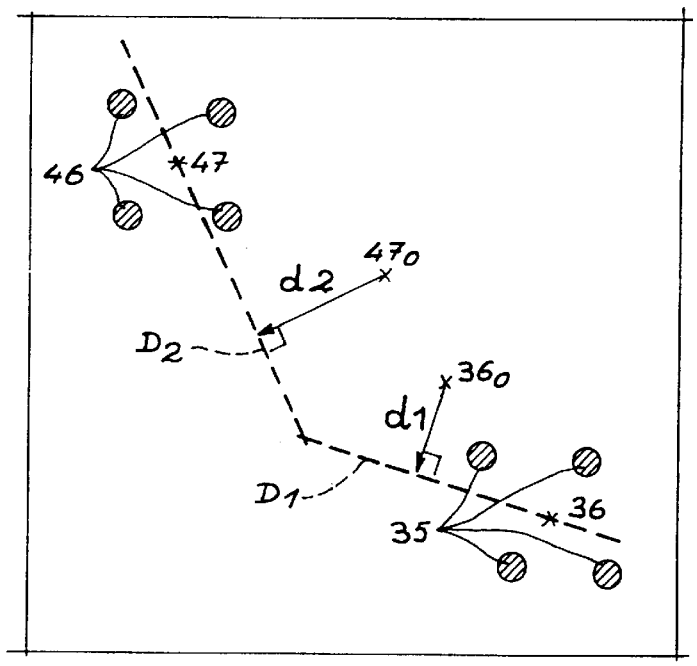
FIG. 6 A sighting axis recognition process.
Figure 7:
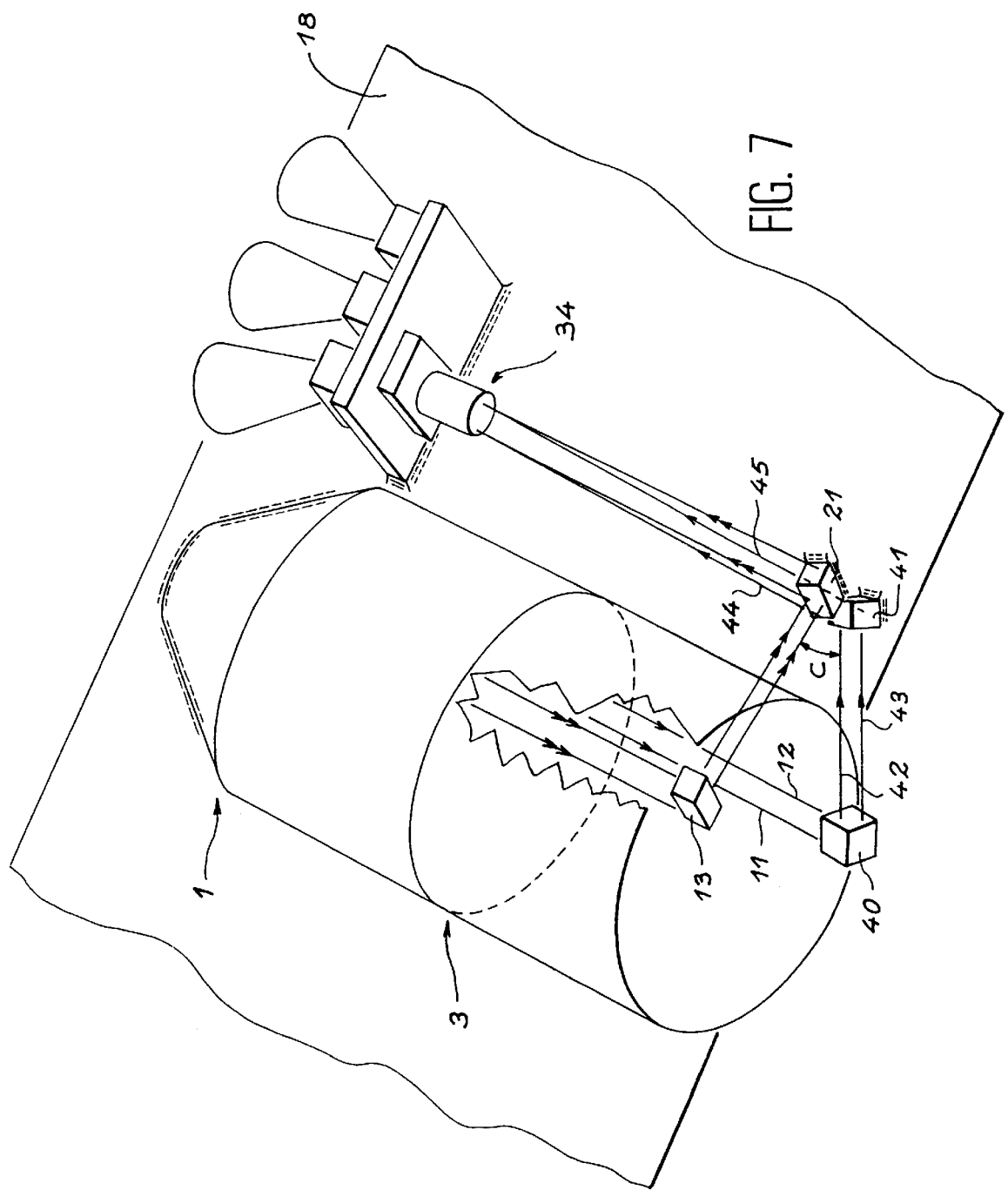
FIG. 7 A complete location system.

It is true that spot 36 will not correspond to that reached by a radiation emitted in the sighting axis, due to possible rotations of the dihedrons 13 and 21. On leaving FIG. 6 to pass to FIG. 7, it is possible to explain how this problem is solved. Use is simply made of another reflecting device, which is like the first and is in particular constituted by two dihedrons 40 and 41 like the dihedrons 13 and 21 and which intercept another portion of the beams 11 and 12 in order to reflect them to the alignment sensor 34. There are in particular reflected beams 42 and 43 between the new dihedrons 40 and 41 and return beams 44 and 45 between the new second dihedron 41 and the alignment sensor 34. The radiation passing through the new dihedrons 40 and 41 extends into a plane different from that of the old dihedrons 13 and 21. It is in fact desirable for said planes to form an angle as close as possible to a right angle, but it is adequate to have an angle C of e.g. 60° in accordance with the layout constraints and in particular the width of the beams 11 and 12, the spacing of the second dihedrons 21 and 41 and the alignment sensor 34 from the instrument 1.

The new system of dihedrons 40 and 41 projects a second light spot pattern 46 onto the detector system 33, whose centre 47 can be calculated. It is a second image of the light spots 5, whereof the distance from the first image formed by the light spots 35 is dependent on the rotations undergone by the return beams 25, 26 and 44, 45. It has been seen that these rotations belong to clearly defined planes, here secant due to the angle C of the two systems of dihedrons 13, 21 and 40, 41. It is therefore sufficient to calculate the straight lines D1 and D2 along which the centres 36 and 47 move due to said rotations in order to deduce the direction of the sighting axis A. If in effect a preliminary calibration of the system had given image centres $36_o$ and $47_o$, it is sufficient to measure the variations D1 and D2 of the spots $36_o$ and 36, and $47_o$ and 47, following a translation parallel respectively to the lines D1 and D2, i.e. the variation D1 is e.g. the distance from the spot 36 on its orthogonal projection from the spot $36_o$ on the line D1 passing through 36. It is possible to estimate the sighting direction A with a precision of five angular seconds following an appropriate calculation.

The alignment sensor 34 having a small viewing field for an instrument 1 nominally fixed to the craft 18 and whose sighting axis scarcely moves in time with respect to said craft, only receives the radiation from the light source and consequently does not have its own orientation reference. It is completed by stellar sensors 49 integral therewith and positioned so as to observe at all times the radiation of a star. An interesting layout consists of placing the alignment sensor 34 and stellar sensors 49 on the two faces of a plate 90 rigidly linked with the craft 18. In this application, where the craft 18 is an artificial satellite and the instrument 1 observes the Earth or some other astron which the vehicle 18 overflies, the stellar sensors 49 are directed in opposition to the instrument 1 towards the sky and the alignment sensor 34 must consequently be directed towards the astron. This is why the radiation of the light sources must be reflected by 180° and that use is made of one pair of dihedrons per image on the detector system 33.

It would be also possible to conceive not using an adequate number of stellar sensors 49 for delivering at all times the position of the alignment sensor 34. Use would then be made of stellar sensors 49 making it possible to carry out an orientation measurement every so often, completing them by a gyroscopic or similar sensor, which would make good their measurements for the remainder of the time.

Figure 8:
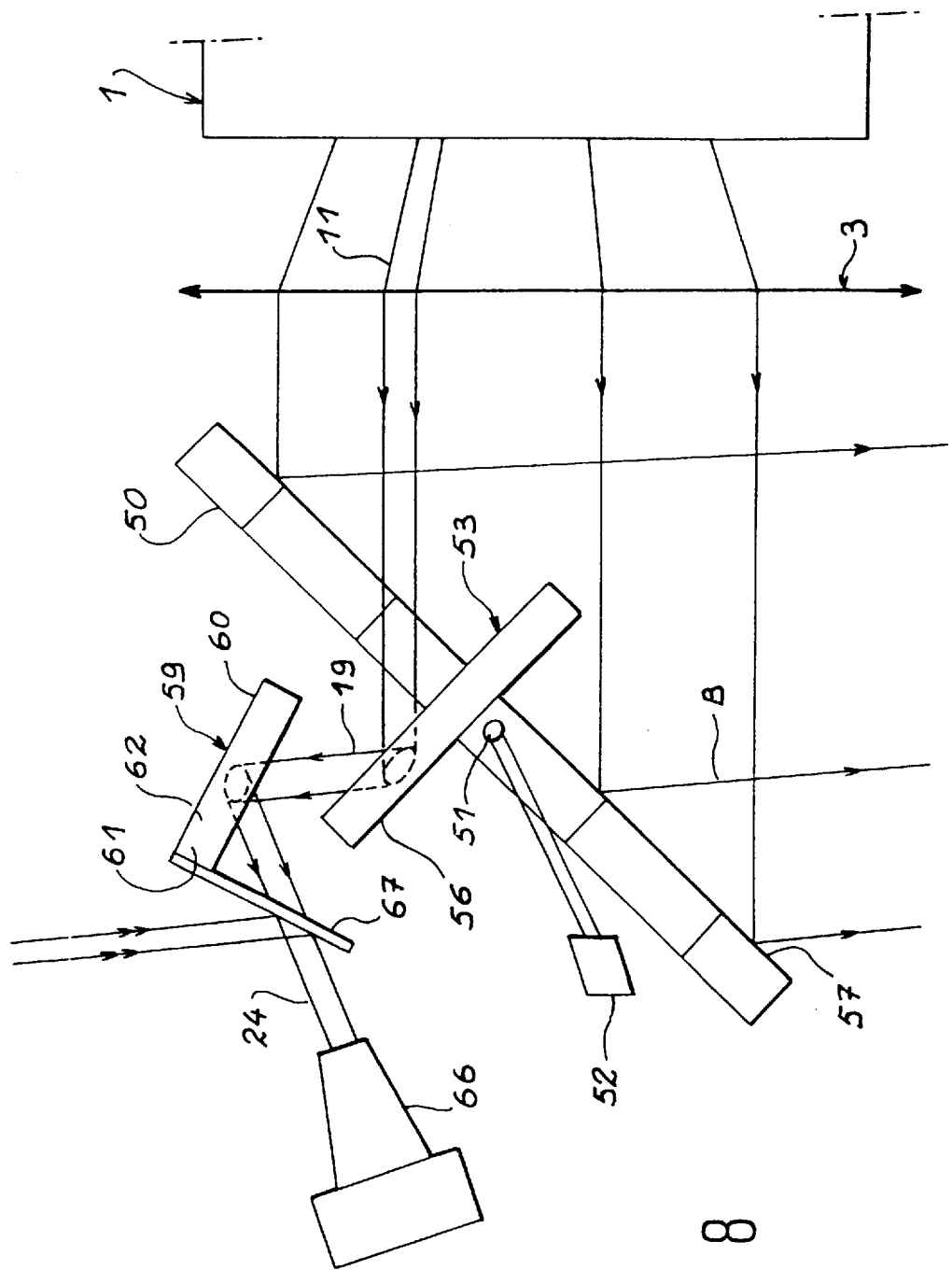
FIG. 8 A location system combined with a sighting change mirror.

With reference to FIG. 8 an explanation is given as to how the system according to the invention can be used with an instrument 1, identical to that of the previous drawings, whilst also being equipped with an optical system 3 and light systems 5, a sighting change mirror 50 rotating about an axis 51 under the action of a motor 52 and reflecting the light coming from a sighting direction variable with the orientation of the sighting change mirror 50 towards the instrument 1.

A first dihedron 53 is fixed on one side of the sighting change mirror 50 and said first dihedron 53 is shown in detail in FIG. 9. It is essentially constituted by two right angled facets 54 and 55 joined by an edge 56 perpendicular to the rotation axis 51 and to the reflecting surface 57 of the sighting change mirror 50. As in the previous variant, the beams from the light sources are reflected on one of the facets 54 or 55 and then on the other 55 or 54 and pass out from the first dihedron 53 in the form of reflected beams. Only beam 11 and reflected beam 19 are shown here.

The shape of the first dihedron 53 combined with its position on the sighting change mirror 50 gives it interesting optical properties equal to those of the dihedrons 13 and 21, although slightly different. Firstly, the accidental translations of the first dihedron 53 do not modify the direction of the reflected beam 19 or rotations about the edge 56. The reflected beam 19 remains parallel to the sighting direction B and opposite to the latter, because the edge 56 is perpendicular to the reflecting surface 57. It is pointed out that the invention still applies if the edge 56 is not strictly perpendicular to said surface whilst forming a constant angle therewith, because the reflected beam 19 maintains a constant angle with the sighting direction B.

It is also possible to provide a second dihedron 59, whose shape is identical to that of the first dihedron 53 and whose edge 60 is coplanar with the edge 56 and is roughly in the same direction. The reflecting facets of the two dihedrons 53 and 59 face one another, so that the reflected beam 19 is reflected by the facets 61, 62 of the second dihedron 59 and is then reflected again in the form of the return beam 24 towards an alignment sensor 66. The second dihedron 59 is stationary with respect to the observation instrument 1 and therefore the satellite.

This is how the second dihedron 59 can be justified. As the angular displacement of the sighting change mirror 50 can be significant, such as 27- (+13.5°) on the Spot satellite, the alignment sensor 66 must have a wider viewing field than in the preceding embodiment, because the reflected beam 19 or return beam 24 has a direction varying from double this value due to the reflection on the dihedron 53. It is therefore useful to use a stellar sensor as the alignment sensor 56 making it detect reference stars over and above the image of the light source. Use is then made of a construction already used in the preceding application, but which imposes appropriately orienting the alignment sensor. If the instrument 1 is aimed virtually towards the horizon of the axis and if the sighting change mirror imposes a right angled reflection of the light arriving at the instrument 1 so that the sighting axis B is directed towards the nadir and the reflected beam 19 towards the zenith, the second dihedron 59 deflects it towards the horizon or towards the astron. The opening of the alignment sensor 66 is then aimed at a portion of the sky. In practice, a semireflecting strip 67 must be placed in front of it perpendicular to the edge of the second dihedron 59 so that the light from the reflected beam 24 traverses it, whereas the light of the stars of part of the sky is reflected towards the alignment sensor 66 on reaching the other face of the semireflecting strip 67.

Reference is again made to FIG. 9 for explaining the construction of the dihedron 53. It is in reality a quartz prism 70 having a triangular section, mainly defined by the reflecting facets 54, 55, which are perpendicular to one another, and a transparent facet 71 by which the light enters the quartz prism 70 and leaves it after being reflected. The reflecting facets 54, 55 are made reflecting by a metallization of the quartz prism 70 covering them with a reflecting coating 72 or 73.

The other dihedrons encountered in this text can all be constructed in the same way with a quartz prism having two metallized facets. However, the dihedrons 13, 21, 13' and 21' could have a quadrilateral section formed by a light inlet facet 74 and 74' for the dihedrons 13, 13' and a light exit facet respectively 75 and 75' for the same dihedrons (FIGS. 3 and 4). Even if a prism is displaced by a rotation, the refraction effects at the entrance and exit facets are balanced, so that the reflected beam remains at right angles with the incident beam. The transparent, planar facet 71 of the dihedron 53 has the same refraction balancing effect.

The description of the present invention will be completed relative to variants of the main solutions described hereinbefore. Thus, the system of FIG. 3 can be replaced by that of FIG. 10, which differs therefrom by the omission of the alignment sensor 34. The plate 90 carrying the stellar sensors 49 is then provided with a reflecting face forming a mirror 91 at the location of the alignment sensor 34. The return beams 25 and 26 are reflected by the mirror 91 towards the dihedrons 21, 13 and finally towards the instrument 1, in accordance with successive reverse beams 92, 93 and 94, which are only outlined because their passage rules are similar to those of the beams emitted towards the mirror 91.

The instrument 1 is then itself responsible for measuring its orientation on the craft 18 and more specifically with respect to the plate 90 serving as a reference. The orientation defects of the dihedrons 13 and 21 have no consequence here due to the deviation compensation undergone by the reverse beams 92 to 94. The displacements of the image of the light spots 5 on the instrument 1, calculated from a reference image obtained during a preliminary calibration of the system, only being dependent on the rotation of the instrument 1 with respect to the sighting axis A since said calibration. It is clearly necessary for the instrument 1 to be suitable for said detection, particularly by having an adequate field of vision. It is for this reason that the detector array 4 may be too narrow and should probably be replaced by a square or rectangular detector system, like that 37 of the alignment sensor 34. However, it is also possible to retain an instrument 1 with a narrow field of vision by increasing the number of light spots 5 in order to ensure that at least two will always be seen by the instrument 1. It must then be ensured that they can be distinguished under these conditions either by a sufficiently irregular arrangement, or by different wavelengths.

Figure 10:
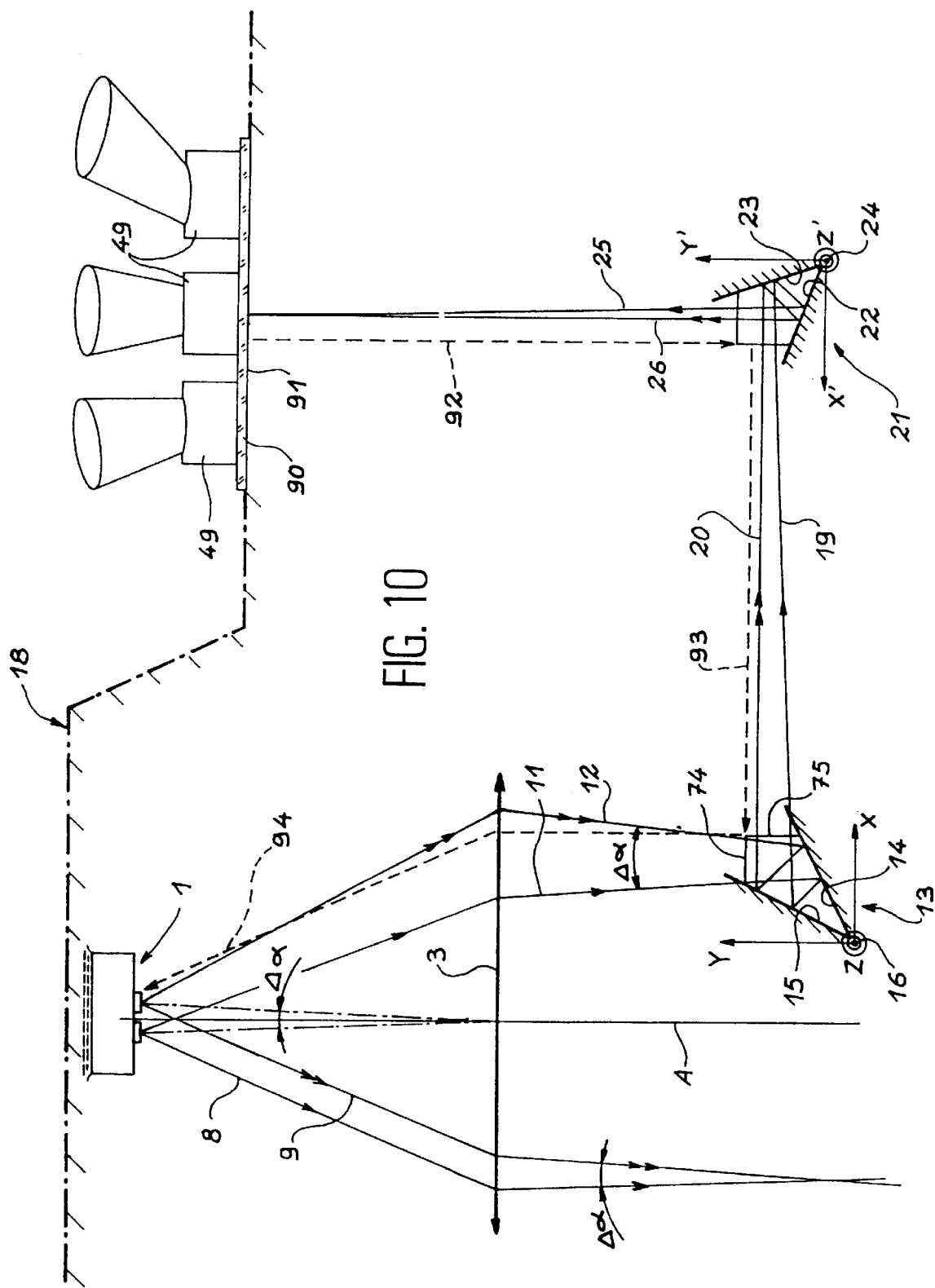
FIG. 10 A variant of FIG. 3.

The solution of FIG. 10 has the disadvantage of requiring larger dihedrons for intercepting the reverse beams 92, 93, together with a precise setting of the focal distance of the optical system 3, but makes it possible to obviate the need for the alignment sensor 34. Although not preferred at present, this standpoint may be changed at a later date.

FIG. 11 shows a layout of the system of FIG. 8 with the interest for the sighting change mirrors 50 with a large angular displacement for which it is necessary to lengthen the dihedron 53 or the second dihedron 59. The sighting change mirror 50 is then flanked by the dihedron 53 and a complimentary dihedron 53', like the first, but which is tilted somewhat with respect thereto about the rotation axis 52. Due to this arrangement, part of the beams such as 11 is intercepted and reflected by the dihedron 53 for a part of the angular travel of the sighting change mirror 50 and another part of the beams is intercepted and reflected by the complimentary dihedron 53' for the remainder of the angular travel. There can be a median travel portion for which the measurement takes place on both dihedrons 53, 53' at once. There is a stellar sensor 66 for each of the dihedrons 53 and 53', or conversely a single stellar sensor 66, if the dihedrons 53 and 53' are located on the same side of the reflecting mirror.

We claim:

1. Orientation location system of an observation instrument comprising a light source integral with the instrument emitting a light pattern to the focal plane of the instrument, a mirror-equipped light reflecting system and a light sensor provided with an orientation reference, the reflecting system being designed so as to transmit light from the source to the sensor, the mirrors comprising a dihedron having two facets on which the light from the source is successively reflected, characterized in that the dihedron is integral with a sighting change mirror rotating in front of the instrument, the reflecting facets of the dihedron forming a right angle and being joined by an edge perpendicular to the plane of the sighting change mirror.

2. Location system according to claim 1, characterized in that the dihedron is a right angled triangular section prism, defined by reflecting facets and by a transparent facet by which the light from the source enters the prism and passes out of the same, the reflecting facets being obtained by a coating of the prism.

3. Location system according to claim 1, characterized in that the reflecting system comprises a second prism fixed with respect to the instrument and reflecting to the sensor the light from the source reflected by the dihedron fixed to the mirror, the reflecting facts of the prism forming a right angle and being joined by an edge coplanar to the edge of the dihedron fixed to the mirror, the light sensor being a stellar sensor.

4. Location system according to claim 3, characterized in that the second prism is provided with a semireflecting strip traversed by the light from the source and reflecting a light from stars.

5. Location system according to claim 4, characterized in that the plane of the semireflecting strip is integral with the edge of the second prism and perpendicular thereto.

6. Location system according to claim 1, characterized in that it comprises a second system for reflecting to a light sensor, the second reflecting system comprising a dihedron having two reflecting facets forming a right angle and joined by an edge perpendicular to the rotation axis of the sighting change mirror, the edges of the dihedrons not being parallel, the reflecting systems being useful for different angular travel portions of the sighting change mirror, an optical system being placed between the instrument and the dihedrons in order to defocus the light from the source and form a widened light beam, the dihedrons intercepting different portions of the widened beam.

* * * * *